Sept. 16, 1924.  1,508,791
P. M. HOFFMAN ET AL
SEARCH OR HEADLIGHT DEFLECTOR
Filed June 13, 1921   3 Sheets-Sheet 1

Sept. 16, 1924
P. M. HOFFMAN ET AL
SEARCH OR HEADLIGHT DEFLECTOR
Filed June 13, 1921    3 Sheets-Sheet 2
1,508,791
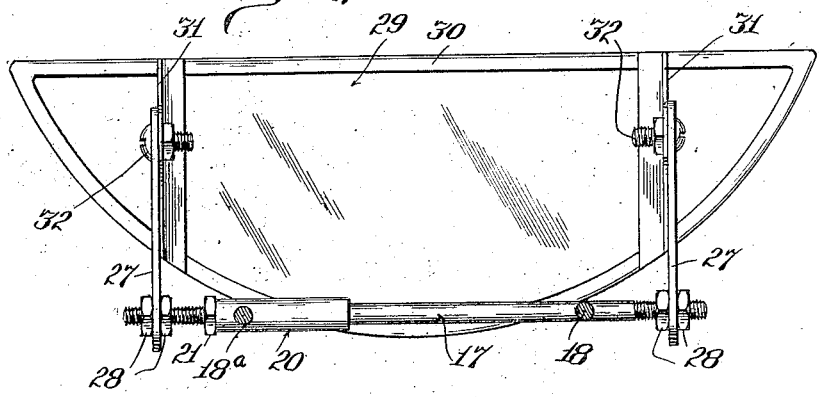
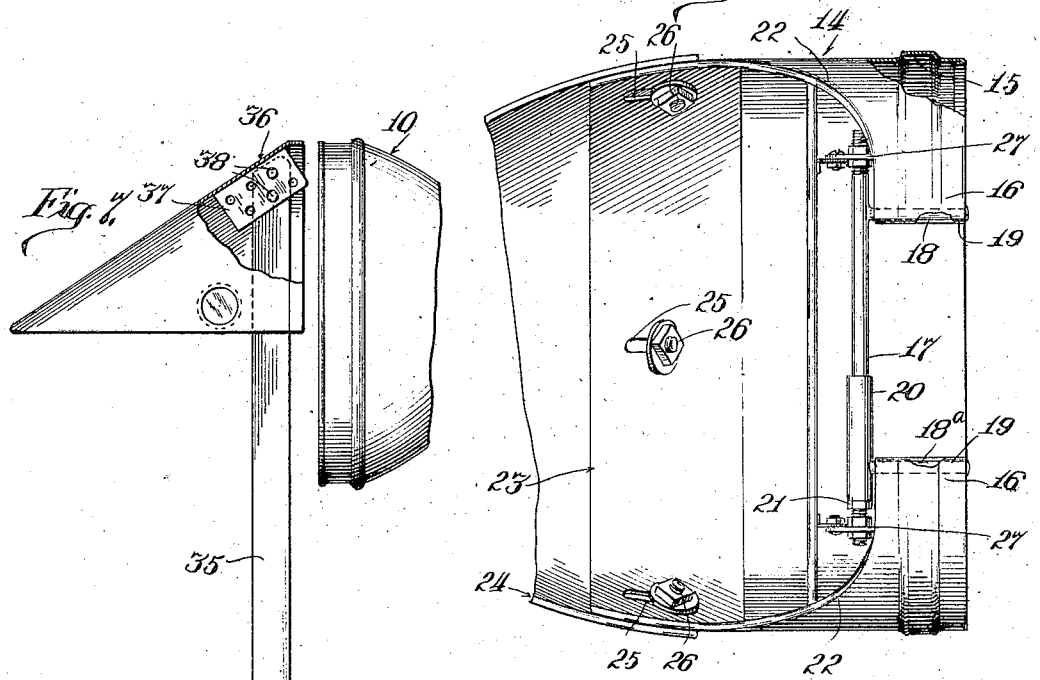

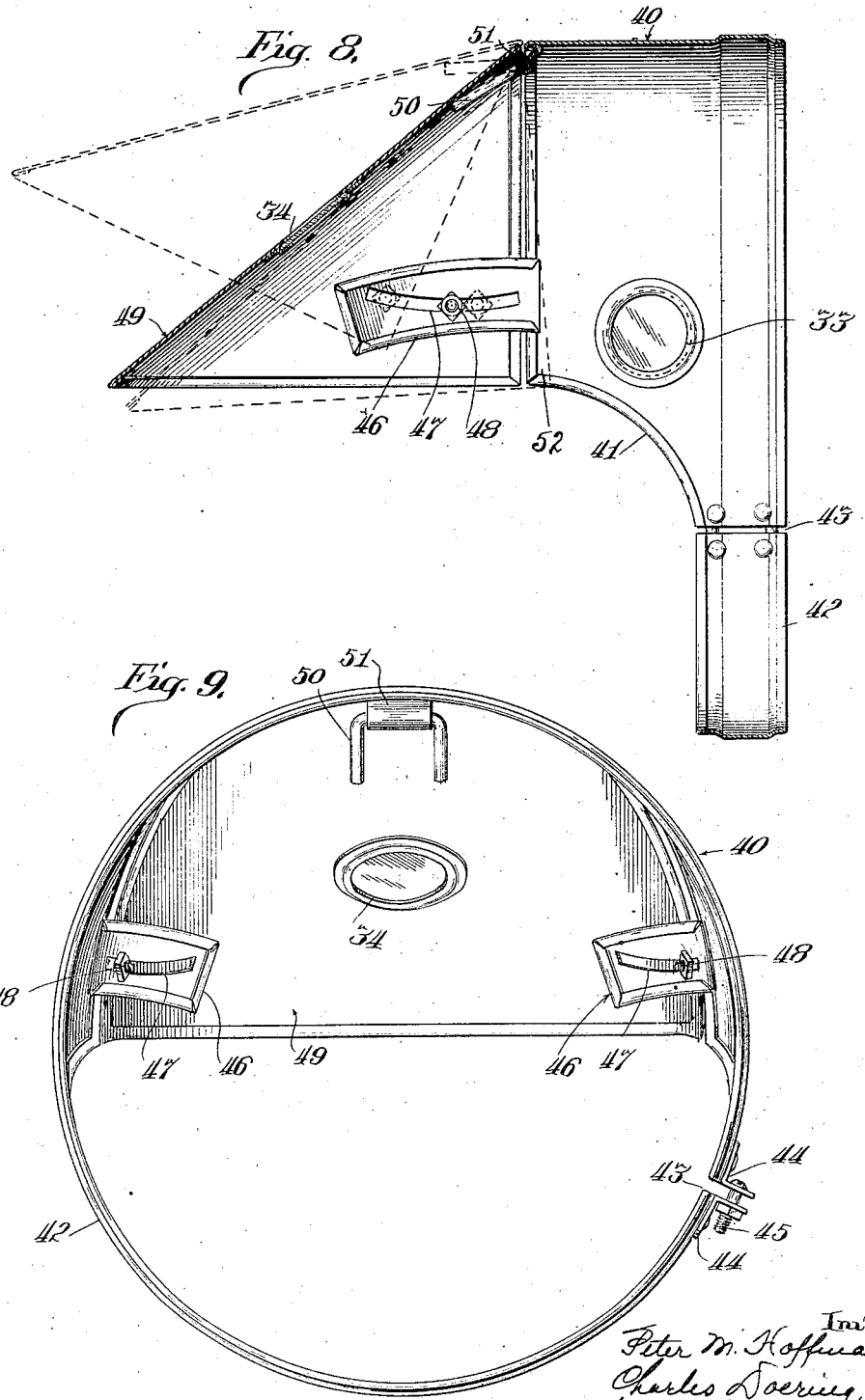

Patented Sept. 16, 1924.

1,508,791

UNITED STATES PATENT OFFICE.

PETER M. HOFFMAN, OF DESPLAINES, AND CHARLES DOERING AND HENRY H. DOERING, OF CHICAGO, ILLINOIS, ASSIGNORS TO DOERING MANUFACTURING COMPANY, OF CHICAGO, ILLINOIS, A CORPORATION OF ILLINOIS.

SEARCH OR HEADLIGHT DEFLECTOR.

Application filed June 13, 1921. Serial No. 476,973.

*To all whom it may concern:*

Be it known that we, PETER M. HOFFMAN, CHARLES DOERING, and HENRY H. DOERING, citizens of the United States, PETER M. HOFFMAN a resident of Desplaines and CHARLES and HENRY H. DOERING residents of Chicago, in the county of Cook and State of Illinois, have invented certain new and useful Improvements in Search or Headlight Deflectors, of which the following is a description, reference being had to the accompanying drawings, which form a part of our specification.

Our invention relates to deflectors for lamps and more particularly for headlights of the character usually employed on motor-driven vehicles; that is to say the invention is adapted for use on searchlights or similar devices where it is desired to concentrate or direct the rays of light and at the same time permit their projection through a considerable distance or space.

The object of our invention is to provide a deflector having an adjustable portion or shield for controlling the bottom glare of the lamp, in conjunction with an adjustable portion or hood whereby the extent or length of the light rays may also be controlled; the invention having for its object the provision of a deflector which may be of metal or any other suitable opaque substance and which may be readily secured or applied to the usual headlights of an automobile or secured independently of said headlights and supported from the forward bumpers of the automobile.

One object of our invention is to provide a construction which may be readily attached onto the usual headlight casing without necessitating alterations or changes in the construction of the headlight body or in the casing of the usual type of spot-light employed on automobiles.

The above enumerated objects and advantages, as well as other advantages inherent in the invention will be more fully comprehended from the detailed description of the drawings wherein:—

Figure 4 is a detail view taken on the line 4—4 of Figure 1 looking in the direction of the arrows.

Figure 5 is an inverted plan view with portions broken away and shown in section.

Figure 7 is a side elevation of a modified form of our improved deflector illustrating a manner of securing it to the front bumpers of an automobile.

Figure 8 is a vertical sectional view of another modified form of our invention.

Figure 9 is a view taken from the rear end of the modified form shown in Figure 8 and looking into the deflector.

Figure 1:
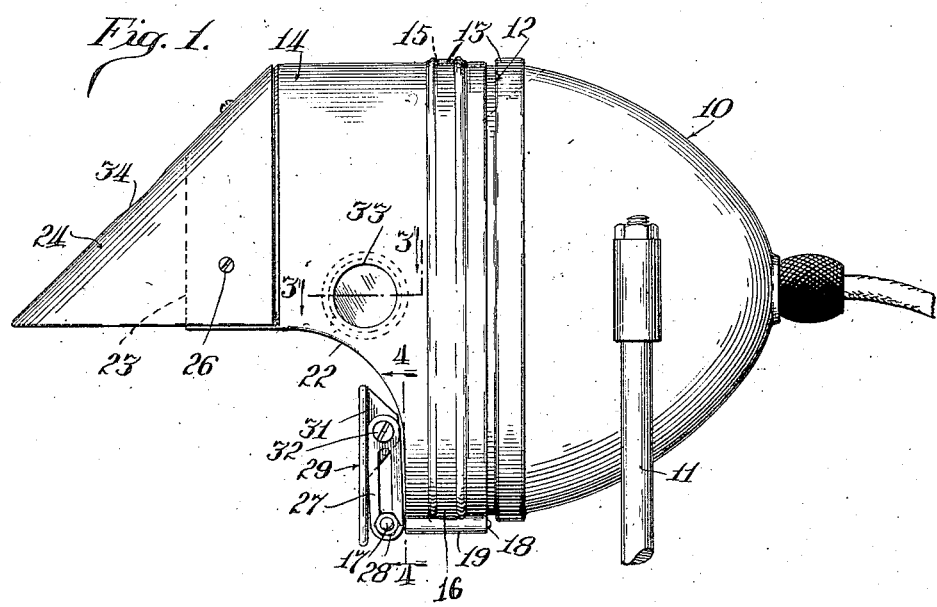
Figure 1 is a side elevation of an automobile type of headlight provided with our improved deflector.
Figure 3:
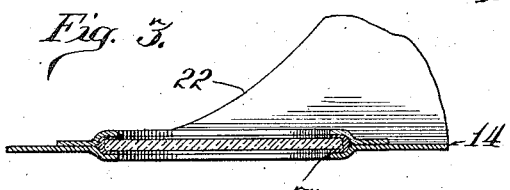
Figure 3 is a detail sectional view taken on the line 3—3 of Figure 1 looking in the direction of the arrows.
Figure 2:
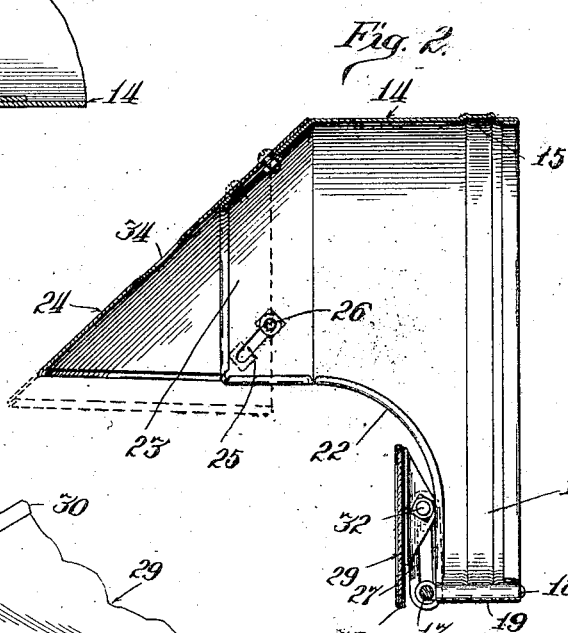
Figure 2 is a vertical sectional view of our improved deflector as illustrated in Figure 1.
Figure 6:
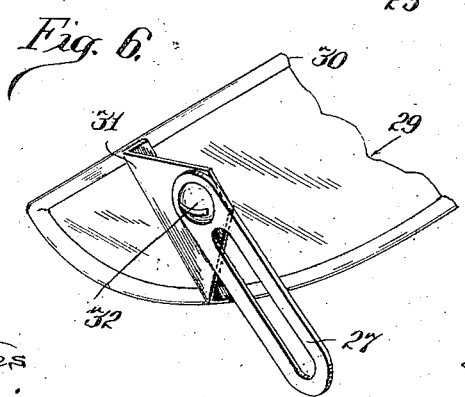
Figure 6 is a detail view in perspective of a portion of the bottom shield and adjusting mechanism.

In the particular exemplification of the invention as illustrated in Figure 1, our improved deflector is shown applied to a well known type of automobile headlight indicated at 10, supported by suitable supporting posts or brackets, a portion whereof is shown at 11. The lamp casing 10 is usually provided with a glass-holding frame or rim indicated at 12 which is shouldered as shown both in dotted and in full lines at 13. The glass-holding frame 12 with its shoulders 13 is intended to receive the main or body portion of our improved deflector which is preferably composed of sheet metal bent to provide a cylindrical shell 14 which is preferably internally formed to provide a circumferential groove 15 (see Figure 2) adapted to fit about and receive the forward shoulder 13 of the glass-holding frame 12 of the headlight. The body portion 14 is in the nature of a split cylinder to permit the deflector to be sprung over one of the flanges or shoulders 13 of the glass-holding frame 12; the separated ends 16 of the shell or cylinder 14, as more clearly shown in Figure 5 being intended to be drawn together by means of a threaded rod 17, which in the particular exemplification, is shown provided with an arm 18 which extends through the adjacent curled end or loop 19, formed on each split end 16 of the body portion or shell 14 of the deflector. A sleeve 20 which is adapted to slide lengthwise on one end of the rod 17 is also provided with a similar arm 18ª; positioning of the sleeve 20 and its arm 18ª being controlled by means of a nut 21 screwed on the threaded end of rod 17 and the resilient or springy nature of the split shell section 14 tends to normally separate the ends 16 and therefore to maintain the sleeve 20 in abutting relation with the nut 21.

With this construction it is evident that a firm clamping of the deflector onto the frame of the headlight is made possible; namely a contracted condition of the split or separated ends 16, can be provided by simply screwing the nut 21 farther onto the rod 17 thereby causing sleeve 20 with its arm 18ª to move toward the opposite end of the rod 17 and its arm 18; accidental removal or withdrawal of the deflector portion 14 being prevented by the forward shoulder or flange 13 seated in the circumferential groove 15 of the body portion or shell 14 of the deflector.

The lower part of the body or shell section 14 is cut away transversely in an arcuate manner from a point preferably slightly beneath the longitudinal axis of the shell 14 and rearwardly as indicated at 22 in order to permit the light rays to pass downwardly at a point immediately forward of the headlight. The forward end of the body portion or shell 14 is made sloping or provided with a segmental flange bent downwardly and forwardly as shown at 23 and this downwardly sloping portion or flange 23 is adapted to receive a sector shaped hood section 24, shaped to conform to the curvature and slope of the flange portion 23 of the shell section 14 in order to be disposed parallel and in telescopic relation therewith. The hood section 24 is normally intended not to extend beneath the upper end of the cut-away portion 22 of the shell section 14. The forwardly and downwardly bent portion or flange 23 of the shell section 14 is shown provided with a number of elongated transverse slots 25 disposed preferably adjacent the opposite sides and at an intermediate point; with the respective slots being disposed along lines radiating from a common center or point parallel with and above the longitudinal axis of the deflector. These slots 25 are adapted to receive short bolts or screws 26 secured to the hood section 24; the bolts or screws in turn being provided with suitable washers and nuts whereby the hood section 24 may be clamped in its adjusted position. With this construction it is apparent that the hood section 24 may be moved forwardly and downwardly below the horizontal plane of the cut-away portion 22 of the shell section 14, namely into the position indicated in dotted lines in Figure 2, thereby regulating the distance or extent to which the light-rays may project forwardly beyond the headlight.

The ends of the rod 17 are disposed beyond the arm 18 and the sleeve 20, previously described, and are adapted to receive the slotted links 27, 27 which are held in their adjusted position and at the desired angularity relative to rod 17, by means of nuts 28. In order to control the glare at the bottom of the deflector, we provide a shield 29, preferably of translucent material such as celluloid and the like, which is shown provided with a suitable metallic frame 30, adjacent opposite ends whereof are provided bracket-members or lugs 31 adapted to be secured to the free ends of the links 27 by means of stud-bolts or screws 32; the ends of rod 17 being made to pass through the elongated slots in the links, thereby enabling the shield 29 to not only swing on the screws 32 and the links on the rod 17, but also permitting the links to be adjusted transversely of the rod 17; the construction just described permitting the links 27 to be either swung through the arc of a circle about the rod 17 or to be moved lengthwise of the slots therein which enables the shield to be disposed at the desired point to control the glare that may be encountered at the lower part of the deflector.

The shell section 14 and the adjustable hood 24 are each shown provided with a glass-receiving opening 33 and 34, respectively, and these openings may be provided with suitable glass or transparent material of any desired color or colors to indicate the sides of the headlight for the guidance of an oppositely moving vehicle.

In Figure 7, we disclose a modification of our invention, wherein the deflector is supported by a suitable bracket or standard 35 which may be secured in any suitable manner to the body portion or hood 36 of the deflector, as for example by having the upper end of the bracket member or bar 35 extend between the two sides of the clip 37 which is U-shape in cross-section, with its intermediate portion rigidly secured to the hood 36 of the deflector. The upper end of the standard 35 and the two sides of clip 37 are provided with a number of openings therethrough, arranged in predetermined spaced relation and adapted to receive one or more pins as at 38. The upper end of the standard may be cut away at an angle as shown to conform more or less to the formation of the hood 36. It is evident that when the pins 38 are withdrawn, the hood 36 may be moved so as to bring different holes in clip 37 into register with a hole in the bracket and thus provide the hood with the desired tilt or angularity. As the deflector is not secured to the casing or housing of the headlight, but is wholly supported by the bracket member 35, which is intended to be bolted or suitably secured to the forward bumper of an automobile as indicated at 39, the deflector need not be provided with a shell section as in Figure 1; the bracket member 35 being of length sufficient to maintain the deflector in proper horizontal relation with the headlight 10 and preferably in slight spaced relation therewith as shown in Figure 7.

In the construction shown in Figures 8 and 9, the shell or lamp engaging section 40 is also preferably provided with a circumferential groove like the construction shown in Figure 1 and the forward side of the shell is cut away in the rearward and downward arcuate manner as indicated at 41 so as to provide a comparatively narrow band portion 42 about the lower portion of the shell and this band portion 42 is severed on one side thereof as indicated at 43, with the adjacent ends at said severed portion each provided with a flange or lug 44, 44 apertured to receive one or more bolts or screws 45 so that when the latter, with their nuts, are screwed inwardly, the split band will be firmly drawn into clamping relation with the housing or body portion of the headlight or lamp. The shell section 40, like the shell section 14 in Figure 1, is shown provided with a glass-receiving opening 33. The upper forward portion of the shell 40, at opposite sides thereof, is provided with the forwardly presented extensions 46, 46, each of which is provided with an arcuate slot 47 adapted to receive a bolt or other suitable means 48, secured to the hood section 49 which is of the arcuate formation similar to the hood section 24 in Figure 1. In the construction shown in Figure 8, the shell section 40 is not provided with a forwardly disposed flange like in Figure 1, but at an intermediate point in the top thereof is provided with means whereby the hood section 49 is hingedly secured to the shell section 40. The hinge means in the particular exemplification is shown in the nature of a U-shape pin or link 50 which is secured to the hood section 49, while the intermediate portion of the link passes through a bracket 51 secured at the forward end of the shell section 40. With the lower sides of the hood section 49 held in place by means of the bolts or pins 48 passing through the slotted extensions 46, it is evident that the hood section 49 may be swung to a predetermined extent on the hinge connection 50—51; the hood section 49 being of dimensions to permit the lower ends thereof to telescope with the sides of the shell section 40 in the manner indicated in dotted lines at 52 when it is desired to decrease the extent to which the rays of light may pass forwardly; the swinging action of the hood section being made possible by the arcuate slots 47. At the same time the hood section 49 may be swung upwardly if desired so as to increase the distance to which the rays of light may extend forward of the deflector. The hood section 49, like the hood sections previously described, may be provided with a glass-receiving opening as at 34.

The hood sections of our deflectors, like the shield section, may if desired be made of celluloid or other suitable translucent material instead of metal and of any suitable color adapted to dim the glare or light rays; the constructions shown being considered the best embodiments of the invention, described in terms and expressions which have been employed merely as terms of description and not of limitation, because structural modifications may be made without, however, departing from the spirit of our invention.

What we claim is:—

1. A deflector of the character described, comprising a split cylindrical shell section adapted to encircle a lamp casing, the forward end of said shell section being provided with a forwardly and downwardly presented flange having slots radiating from a common center, means whereby the split ends may be contracted, an arcuate hood section arranged in telescopic relation with said flange, means secured to said hood section and adapted to extend through said slots whereby the hood section may be raised or lowered, and a shield section adjustably secured to said first means and disposed transversely of the lower portion of said shell section so as to move toward or away from the shell section.

2. A deflector of the character described, comprising a split cylindrical metallic shell section, a screw-threaded rod operatively connected with the split ends of said shell section whereby said split ends may be contracted, a shield section adjustably mounted on said screw-threaded rod so as to be disposed transversely of the lower part of said shell section, and a hood section adjustably secured to the upper part of said shell section.

3. A deflector of the character described, comprising a split cylindrical shell section adapted to encircle the lamp casing, a screw-threaded member whereby the split ends of the shell section may be contracted, slotted links adjustably secured on said threaded member, a shield section adjustably secured to said slotted links and disposed transversely of the lower part of said shell section, and a hood section adjustably secured to the upper part of the shell section and in telescopic relation therewith.

4. A deflector of the character described, comprising a split cylindrical shell section having a portion of the lower sides cut away in arcuate manner, a pair of telescopic members, each connected with one of the split ends of said shell section, means whereby the telescopic relation of said members may be controlled and the split ends thereby contracted, a translucent shield adjustably secured to one of said telescopic members and disposed transversely of the lower part of said shell section, a segmental hood arranged in telescopic relation with the upper part of said shell section, and means whereby said hood section may be moved in a direction transversely of the upper part of the shell section and be maintained in telescopic relation therewith.

5. A deflector of the character described, comprising a metallic split cylindrical shell section, the ends whereof are normally in spaced relation and curled upon themselves, a threaded rod provided with an arm disposed through one of said curled ends of the shell section, a sleeve member slidable on said rod and provided with an arm disposed through the other curled end of said shell section, means whereby the relation between the sleeve and rod may be controlled and the ends of said shell section drawn together, link members pivotally mounted on said rod, a translucent shield section pivotally secured to said links and disposed transversely of the lower part of said shell section, a sector-shaped hood section arranged in overlapping relation with the upper part of said shell section, and means whereby the hood section may be moved in a direction transversely of the shell section and be maintained in its adjusted position.

6. A deflector of the character described, comprising a split cylindrical shell section, means whereby the split ends may be drawn together, a hood secured to the forward side of said shell section, means pivotally secured at the lower side of said shell section so as to swing vertically, and a shield section, disposed transversely of the lower part of the shell section, pivotally secured to said means and adjustable lengthwise thereof, whereby the position of said shield section relative to the longitudinal axis of the cylindrical shell section may be determined.

7. A deflector comprising a split shell or band having a forwardly and downwardly sloping hood, means whereby the split shell may be drawn into clamping relation with a lamp casing, a pair of slotted members pivotally secured to the lower part of said shell so as to swing vertically, and a shield pivotally mounted in the slots of said members to swing vertically and be adjustable lengthwise of said members.

PETER M. HOFFMAN.
CHARLES DOERING.
HENRY H. DOERING.

Witnesses:
B. AMONDSEN,
J. H. BAUMGARTNER.